(12) United States Patent
Banks et al.

(10) Patent No.: US 7,590,760 B1
(45) Date of Patent: Sep. 15, 2009

(54) HYBRID INTERFACE SYNCHRONIZATION METHOD AND DRIVER-CLIENT MODEL FOR HIGH AVAILABILITY SYSTEMS

(75) Inventors: Donald Banks, San Jose, CA (US);
Vijay Savla, Acton, MA (US); Timothy Donahue, Natick, MA (US);
Balachander Chandrasekaran, Milpitas, CA (US); Denis Leclerc, Sterling, MA (US)

(73) Assignee: Cisco Technology, Inc., San Jose, CA (US)

( * ) Notice: Subject to any disclaimer, the term of this patent is extended or adjusted under 35 U.S.C. 154(b) by 1441 days.

(21) Appl. No.: 10/156,556

(22) Filed: May 24, 2002

(51) Int. Cl.
*G06F 15/16* (2006.01)
*G06F 15/173* (2006.01)
*G06F 11/00* (2006.01)

(52) U.S. Cl. .................... 709/248; 709/223; 714/11
(58) Field of Classification Search ........... 714/11; 709/238, 248, 223
See application file for complete search history.

(56) References Cited

U.S. PATENT DOCUMENTS

| | | | | |
|---|---|---|---|---|
| 6,085,333 A * | 7/2000 | DeKoning et al. | ............ | 714/7 |
| 6,148,410 A * | 11/2000 | Baskey et al. | ............ | 714/4 |
| 6,418,116 B1 * | 7/2002 | Egoshi | ............ | 370/217 |
| 6,604,177 B1 * | 8/2003 | Kondo et al. | ............ | 711/150 |
| 6,622,265 B1 * | 9/2003 | Gavin | ............ | 714/38 |
| 6,785,840 B1 * | 8/2004 | Smith et al. | ............ | 714/11 |
| 6,865,591 B1 * | 3/2005 | Garg et al. | ............ | 709/201 |
| 6,886,107 B2 * | 4/2005 | Walsh et al. | ............ | 714/4 |
| 2003/0056138 A1 * | 3/2003 | Ren | ............ | 714/4 |

OTHER PUBLICATIONS

Cisco Systems, Inc., "Overview: Cisco 7500 Series Routers High-Availability Initiative Beat the Downtime", 6 pages, retrieved from the Internet on Mar. 15, 2002: <URL:http://www.cisco.com/warp/public/cc/pd/rt/7500/prodlit/haibd_ov.htm>.
Cisco Systems, Inc., "White Paper: High availability for the Catalyst 6000 Family", 26 pages, retrieved from the Internet on Feb. 20, 2002: <URL:http://www.cisco.com/warp/public/cc/pd/si/casi/ca6000/tech/hafc6_wp.htm>.
Cisco Systems, Inc., "Route Processor Redundancy Plus for the Cisco 12000 Series Internet Router", 22 pages, retrieved from the Internet on Feb. 20, 2002: <URL:http://www.cisco.com/univercd/cc/td/doc/product/software/ios120/120newft/120limit/120st/120st17/rpr_plus.htm>.
Cisco Systems, Inc., "White Paper: Cisco Express Forwarding (CEF)", 7 pages, retrieved from the Internet on Apr. 9, 2002: <URL:http://www.cisco.com/warp/public/cc/pd/iosw/iore/tech/cef_wp.htm>.

* cited by examiner

*Primary Examiner*—Larry D Donaghue
*Assistant Examiner*—Brian J Gillis
(74) *Attorney, Agent, or Firm*—Charles E. Krueger

(57) ABSTRACT

A system and method for supporting a "hitless" switchover from an Active to a Standby processor uses a hybrid synchronization of interface states to allow applications that have been modified to have HA aware features and non-modified applications to function on the system. An interface description data block on the Standby RP is synchronized to the interface description data block on the Active RP and is maintained in a shadow state when the Active RP controls the system. In the event of a switchover between the RPs the interface description data block on the Standby RP is copied from the shadow state to a real state and applications on the Standby RP are notified of a status change.

16 Claims, 4 Drawing Sheets

HYBRID INTERFACE SYNCHRONIZATION METHOD AND DRIVER-CLIENT MODEL FOR HIGH AVAILABILITY SYSTEMS

BACKGROUND OF THE INVENTION

As the number of Internet users and Internet-based mission-critical applications increase daily at an unprecedented pace, service-provider and enterprise customers are demanding greater reliability and availability. When every minute of downtime can mean millions of dollars in lost revenue and embarrassing headlines, companies are eagerly looking for solutions to make their systems highly available. Thus, High-Availability (HA) networking products help customers increase uptime and protect financial performance, reputation, and customer loyalty.

Redundancy is one of the key methodologies used to increase system availability. One HA feature is to include both Active and Standby route processors in the router. When the Active Route Processor (RP) fails or is requested to switch over, the Standby Route Processor takes over so that the system continues processing and forwarding. Switchover occurs when system control and routing protocol execution is passed from the Active RP to the Standby RP. A "hitless" switchover implies no loss of sessions and continued forwarding of traffic during the switchover. The system maintains the appearance of a single router with a single management interface to the outside world at all times so that when a failure occurs, migrating control to another processor is not visible.

Existing systems employ such methodology to deal with route processor failure and increase the system availability. However, there are still areas in this process that can be optimized. In the switchover process, the time from initial failure to first packet transmission can be broken down as follows:

1. Time to identify failure
2. Time to load and boot software on Standby RP
3. Time to load new configuration on Standby RP
4. Time to reset and reload line cards
5. Time to load new configuration on line cards
6. Time to learn routes and pass keepalive message
7. Route convergence
8. Time to begin forwarding again
9. Time to reestablish layer 2 services.

This simplest approach is called Cold Standby, which implies that the entire system will lose function for the duration of the restoration. All sessions and all traffic flowing through the router are lost during the recovery time. The benefit of using Cold Standby is that the router restarts without manual intervention by rebooting with the Standby RP taking control of the router.

Various processor redundancy schemes eliminate one or more of the above steps. For example the second and third steps can be eliminated if the Active and Standby RPs both boot and initialize upon powerup. If the line cards are kept up during switchover then the fourth and fifth steps can be eliminated. A "hot" Standby RP is fully initialized and synchronized with the Active RP and is able to implement a hitless switchover. The time taken by steps 6 and 7 can be hidden by reducing step 8 to zero or near zero time. Step 9 can be reduced to a few seconds HA features are especially important on edge routers because these routers do not benefit from redundant network architecture topologies that core routers typically benefit from, and, therefore, are likely to be a single point of failure in a network. Customers see the downtime as a major obstacle to their business goals and customer relations. However, it is not always possible to build equipment and circuit redundancy throughout the entire network. Therefore the availability initiatives of an edge router must concentrate on features that will:

Isolate any errors on one part of the router from affecting the rest of the system.

Allow a faulty processor to switch over to any redundant processors in the event of a failure.

Minimize the switchover time between processors.

In order to ensure that a "hot" Standby processor is able to take up where the Active left off when a switchover occurs, it is required that both the Active and the Standby Control Processors are configured exactly the same at all times. This is necessary so that applications and system services that depend on configured resources have the same resources available on the Standby as they had on the Active before the switchover. Synchronization of the interface and controller state from the Active to the Standby for a set of shared interfaces is also required to enable a transparent, or "hitless", switchover between the redundant control processors. All resources and states remain intact during switchover so that forwarding can continue and the control plane can quickly recover the interfaces transparently for the protocols and features using them on the Standby RP.

IOS® is Cisco's Internetwork Operating System software which delivers intelligent networking services on Cisco routers. Stateful IOS services and protocols running on the Active checkpoint state data to the Standby ensuring that it is always current and capable of taking over where the Active left off when a switchover takes place. In some architectures, a Forwarding Processor (FP) is packaged with the RP so that they fail as a unit. In such architectures, the FP packaged with the Standby RP must be kept synchronized with the FP packaged with the Active RP.

In systems that provide this functionality, it is expected that the individual HA-aware applications and system services create and maintain the necessary resources and checkpoint any state associated with the necessary resources to the Standby as the state changes on the Active. In existing systems, this only works when all elements of the system are properly instrumented and are HA-aware. For IOS®, in order to allow applications to migrate to HA-aware implementations as demand requires, most applications and services are not HA-aware and therefore are not modified to create required resources on the Standby as well as the Active.

Many other attempts at providing this functionality use hardware redundancy only, which typically affects the software interface and requires an extended recovery time accompanied by a service interruption. Other hardware/software implementations don't provide for both "HA-aware" and "HA-unaware" features/applications to co-exist requiring enormous software changes in the code base in order to support an HA environment.

BRIEF SUMMARY OF THE INVENTION

In one embodiment of the invention, interface states on the Active and Standby RPs are hybridly synchronized to allow both HA-aware and HA non-aware applications to be utilized.

In another embodiment of the invention, an interface description data block on the standby is kept synchronized to an interface description data block on the active so that the interfaces can be recovered without interruption during a switchover.

In another embodiment of the invention, the interface description data block on the Standby is maintained in a shadow state prior to switchover so that interfaces will appear down to applications on the Standby RP, while possibly appearing as "up" to applications on the Active RP.

In another embodiment of the invention, the shadow interface description data block state is copied to a real interface description data block state during switchover so that applications on the Standby RP can quickly recover the interfaces.

In another embodiment of the invention, forwarding tables are kept synchronized so that sessions are not interrupted during switchover.

Other features and advantages of the invention will be apparent in view of the following detailed description and appended drawings.

DETAILED DESCRIPTION OF THE INVENTION

The invention will now be described with reference to various embodiments. The first embodiment to be described, by way of example not limitation, is implemented on a router architecture designed by the assignee of the present invention.

Generally a router includes a chassis, which contains basic components such as power supply, fans, slots, ports and modules that slide into the slots. The modules inserted into the slots are line cards which are the actual printed circuit boards that handle packet ingress and egress. Line cards provide one or more interfaces over which traffic flows. Thus, depending on the number of slots and interfaces, a router can be configured to work with a variety of networking protocols.

Figure 1:
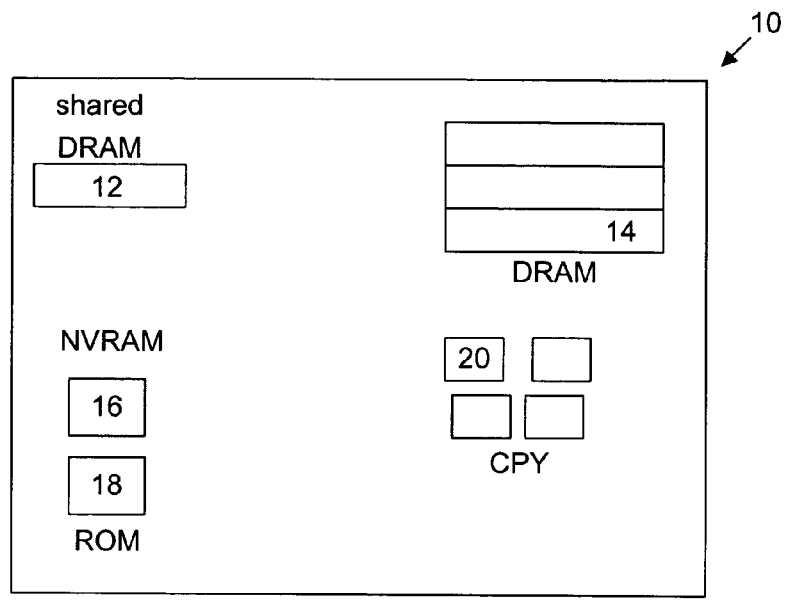
FIG. 1 is a block diagram of motherboard of a router.

The router is a computer and includes a motherboard having components depicted in the block diagram of FIG. 1.

In FIG. 1, the motherboard 10 includes shared DRAM 12, DRAM 14, NVRAM 16, ROM 18 and a CPU 20. (Other components on the motherboard not relevant to the present description are not depicted). The DRAM 14 is the working storage utilized by the CPU and the shared DRAM 12 is dedicated to handling the router's packet buffer. The NVRAM (non-volatile RAM) is used to store the router's configuration file and also includes flash memory for storing an image of the IOS® (Internetworking Operating System). The ROM 18 holds a boot-start program which holds a minimum configuration state needed to start the router.

As described above, a "hitless" switchover requires that no loss of sessions occur. For non-HA aware applications, line cards are reset to synchronize the state of the line with the state of the line card representation in IOS® on the newly-active RP, i.e., the previous Standby RP. This resetting of the line cards causes a loss of service.

Figures 2A, 2B:
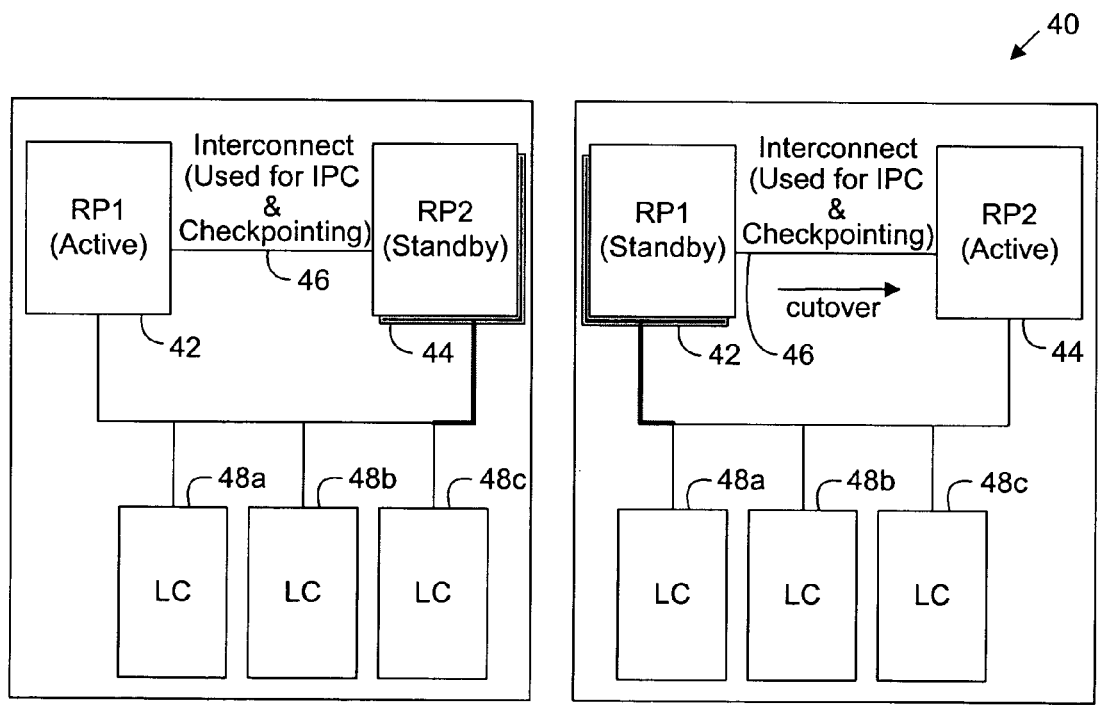
FIGS. 2A and B are block diagrams depicting a redundant system utilized in a preferred embodiment of the invention.

An embodiment of a system for maintaining configuration synchronization between the Active and Standby RPs will now be described. FIGS. 2A and 2B are block diagrams of the system.

Stateful IOS® services and protocols running on the Active RP checkpoint state data to the Standby ensuring that it is always current and capable of taking over where the Active left off when a switchover takes place. In some architectures, a Forwarding Processor (FP) is packaged with the RP so that they fail as a unit. In such architectures, the FP packaged with the Standby RP must be kept synchronized with the FP packaged with the Active RP.

In FIGS. 2A and B, an HA system 40 consists of redundant Active RP1 42 and Standby RP2 44 interconnected via some media 46 with sufficient bandwidth that it can be used for Inter-Processor Communication (IPC) and checkpointing messages between the Active and Standby RP. This may or may not be a dedicated media. This interconnect 46 can be a dedicated Ethernet interface, some fabric interconnect or an internal bus, but it should be sized to support peak bandwidth requirements experienced during initialization or periods of high connection rate when a great deal of state information is being synchronized. Ideally this interconnect 46 should provide at least two paths since it is a critical single point of failure in the system. This communication path is best implemented as an out-of-band data path so that it is available at all times and so that it does not impact the routed traffic being serviced by the router.

Each RP is also connected to the Line Cards 48a, b, and c through some system bus or other interconnect 50. The Line Cards 48 must be sharable (i.e., accessible to each RP 42 or 44) over this interconnect 50 although their access may be serially restricted; only the Active RP 42 may own and operate the Line Cards providing service at any point in time. When a service affecting fault occurs on the Active RP 42 (or a manual switchover is requested) the Standby RP 44 begins the process of assuming control of the Line Cards 48 and transitioning the Standby applications to Active so that the Standby can begin providing service as the new Active. FIGS. 2A and B demonstrate a system with the specified attributes before (FIG. 2A) and after (FIG. 2B) a switchover. Here RP2 44 becomes the new Active after the switchover and assumes control of the Line Cards.

The line card drivers control each line card and provide a software interface with applications. In the currently described embodiment, the IOS® software Inter-process Communications (IPC) services serve as the means by which line cards (LCs) and the central route processor (RP) in a distributed system communicate with each other by exchanging IPC messages sent from the RP to the LCs and also between Active and Standby RPs. These messages include configuration commands and responses to those commands, as well as "events" that need to be reported by an LC to the RP.

In this embodiment, all line cards running IPC services and the RP maintain an IPC hardware queue. Two cards communicate by placing an IPC message into the hardware queue. When the queue on an RP becomes non-empty, an interrupt is generated. This interrupt eventually leads to the dequeueing and processing of an IPC message. On a line card, the driver polls its IPC queue to fetch any queued messages An embodiment of the invention will now be described with reference to FIG. 3. The model by which line card drivers track the status of the line card interfaces on the Active, so that the Standby is able to recover the interfaces when a switchover occurs and make them available to services and protocols, is based on a stateful interface model for hardware IDBs.

An IDB is an interface description block. An IDB sub-block is an area of memory that is private to an application. This area stores private information and state variables that an application wants to associate with an IDB or an interface. The application uses the IDB to register a pointer to its sub-block, not to the contents of the sub-block itself. Thus, the pointer in the IDB is used to access the contents of the IDB.

A stateful model requires that the IDBs at the Standby RP be synchronized periodically with the IDBs at the Active RP to reflect any changes that occur to the IDBs at the Standby RB.

Figure 2C:
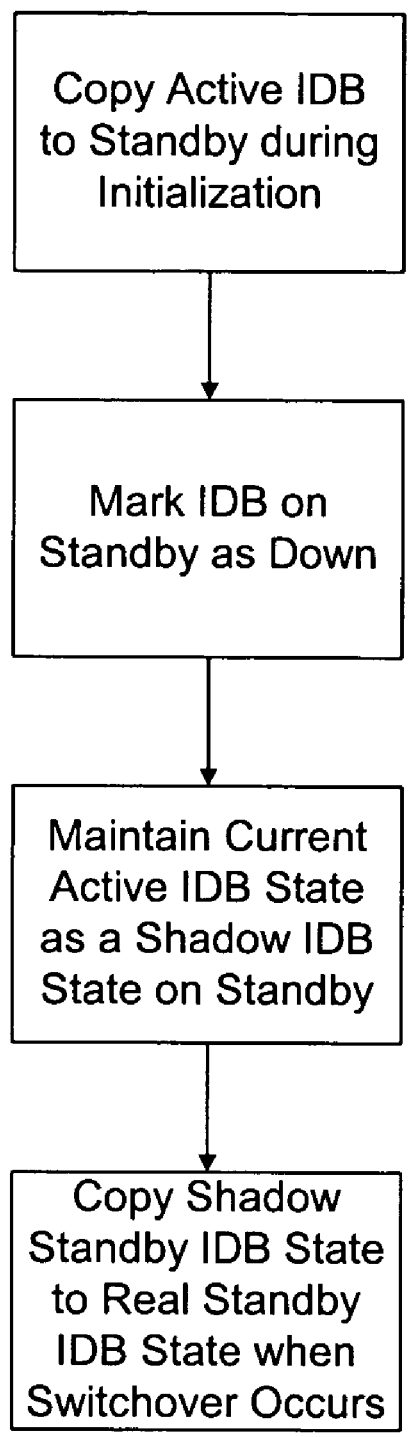
FIG. 2C is a flow chart depicting the steps of an embodiment of the invention.

The system for effecting this synchronization is described more fully below with reference to FIG. 2C. In contrast, a non-stateful model would copy the IDB during initialization but would not synchronize the IDB subsequently. In the non-stateful case all protocols would be restarted from initialization in the event of a switchover.

Depending on the platform and/or the line card, either the platform dependent drivers or the platform independent media layer copy the interface state from the IDB on the Active to the IDB on the Standby.

During operation of the router, only the Active RP communicates with line cards. Thus, IDBs on the Standby RP must be viewed as on-line-insertion-removed (OIR-removed) otherwise non-HA aware applications on the Standby RP would signal an error because those non-HA aware applications would expect the Standby RP to be communicating with the LCs if the IDB were not viewed as OIR-removed.

Accordingly, in the currently described embodiment, the actual state is not updated on the Standby RP. A "shadow state" is used to maintain the interface state that is current on the Active RP. The IDB state on the Standby is marked as "down" until the switchover happens. This enables HA-unaware services and protocols on the Standby to initialize to the point that they are waiting for an "interface available" signal without any code changes. HA-aware applications can be implemented to track the shadow state or not as required.

When a switchover occurs, the shadow IDB state is copied to the real IDB state and all clients are notified via the normal interface state change mechanism, in this embodiment, net_cstate( ). To HA-unaware clients on the Standby, it appears as if the Line Card interface has just become available. This is the same as the non-HA aware model of execution and so, for those protocols and implementations that are not HA-aware, no change is required beyond those required to run correctly on a non-HA aware system.

HA-aware clients can proceed from the point where the Active left off execution and begin to provide service immediately as the line card becomes available; no additional initialization is required for them. The HA-aware clients will "see" the shadow copy induced net_cstate( ) transition but ignore the state change unless it differs from their internal interface state. In the unlikely case that the internal state does differ the HA-aware clients can adjust their internal states to avoid inconsistencies. This model allows a simple transition scheme for protocols and features to HA-aware as business demands require.

An additional feature for facilitating a "hitless" switchover is preloading forwarding information. In one embodiment, a forwarding information base (FIB) and adjacency tables are utilized to provide express forwarding capabilities. Entries in the FIB are used by the line cards and/or Forwarding Engines during forwarding. When the routing table changes in the RP the FIBs are updated.

Figure 4:
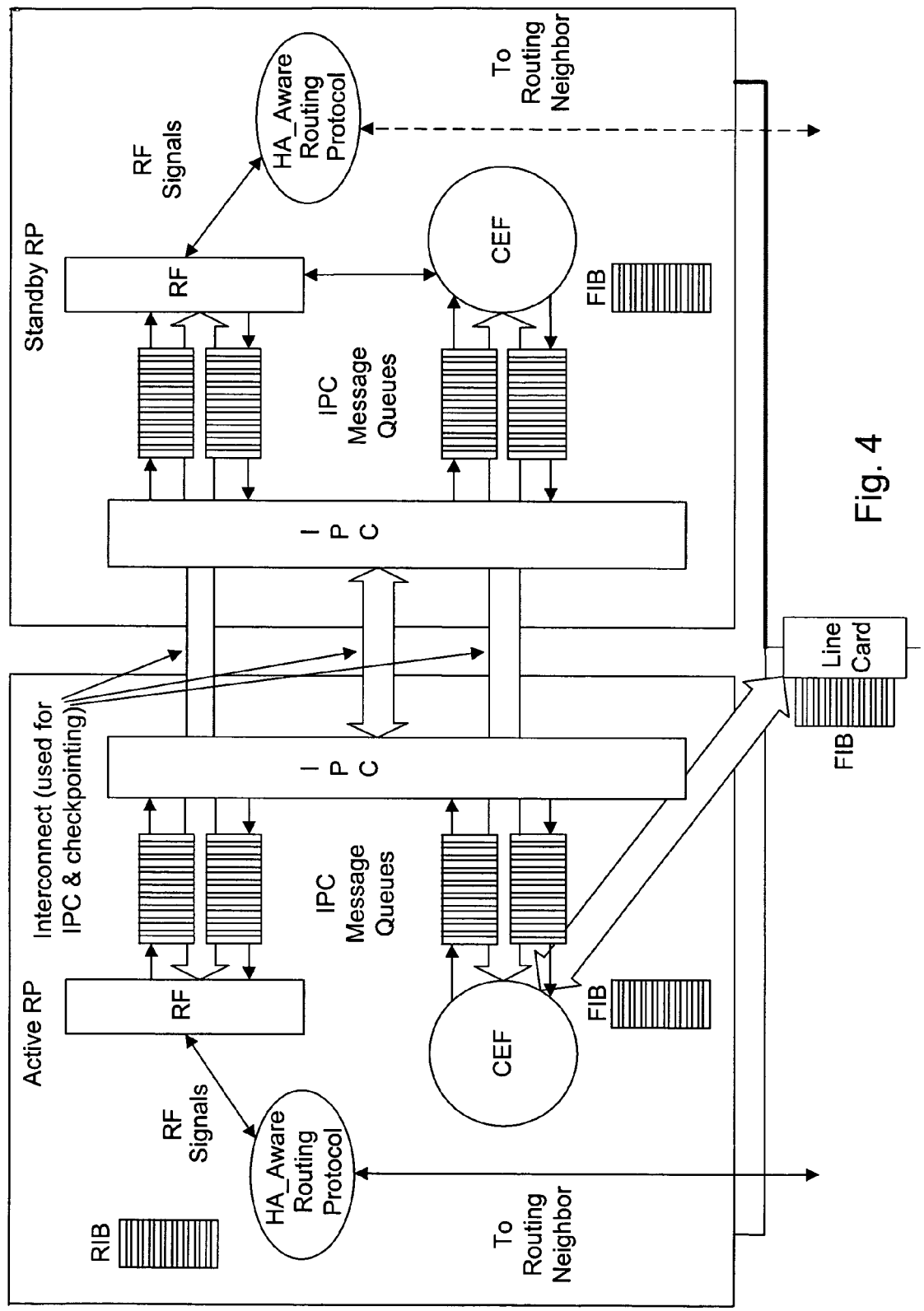
FIG. 4 is a block diagram depicting a system for synchronizing packet forwarding information on the Active and Standby RPs.

In this embodiment of the invention, as depicted in FIG. 4, during normal operation, an express forwarding (EF) application on the Active RP will synchronize its current FIB and adjacency databases with the FIB and adjacency databases on the Standby RP. Upon switchover of the Active RP, the Standby RP will initially have FIB and adjacency databases that are mirror images of those that were current on the Active RP. For platforms with intelligent Line Cards, the Line Cards will maintain the current forwarding information over a switchover; for platforms with Forwarding Engines, the EF application will keep the Forwarding Engine on the Standby current with changes that are sent to it by the EF application on the Active RP.

In this way, the HA-aware Line Cards or Forwarding Engines will be able to continue forwarding after a switchover as soon as the interfaces and a data path(s) are available. As the routing protocols start to repopulate the RIB on a prefix-by-prefix basis, the updates in turn cause prefix-by-prefix updates to the EF application which it uses to update the FIB and adjacency databases. The forwarding information is being updated on the line cards/forwarder during convergence so that the FIB now represents the newest routing protocol forwarding information.

As described above, one of the key components of any highly available system which implements stateful switchover is the sharing of peer client, entity-specific, state data between peer instantiations of a client running on an Active and Standby instance of IOS®. The client entity-specific state data must be initially synchronized (i.e., between the Active or Standby RP at initialization) and at any time state data, critical to a successful Active to Standby client switchover, occurs. The initial synchronization is also called "bulk sync" and the later synchronization is called "dynamic sync". In this embodiment, dynamic sync for configuration is implemented by a process called "line-by-line sync".

In the currently described embodiment a Redundancy Facility (RF) can assist with the "when to" synchronize while the system is progressing to a steady state condition. During steady state operation, the applications themselves must decide when to synchronize. The Checkpointing Facility (CF) assists with the "how to" synchronize. The RF and CF will now be briefly described with reference to FIG. 3.

Figure 3:
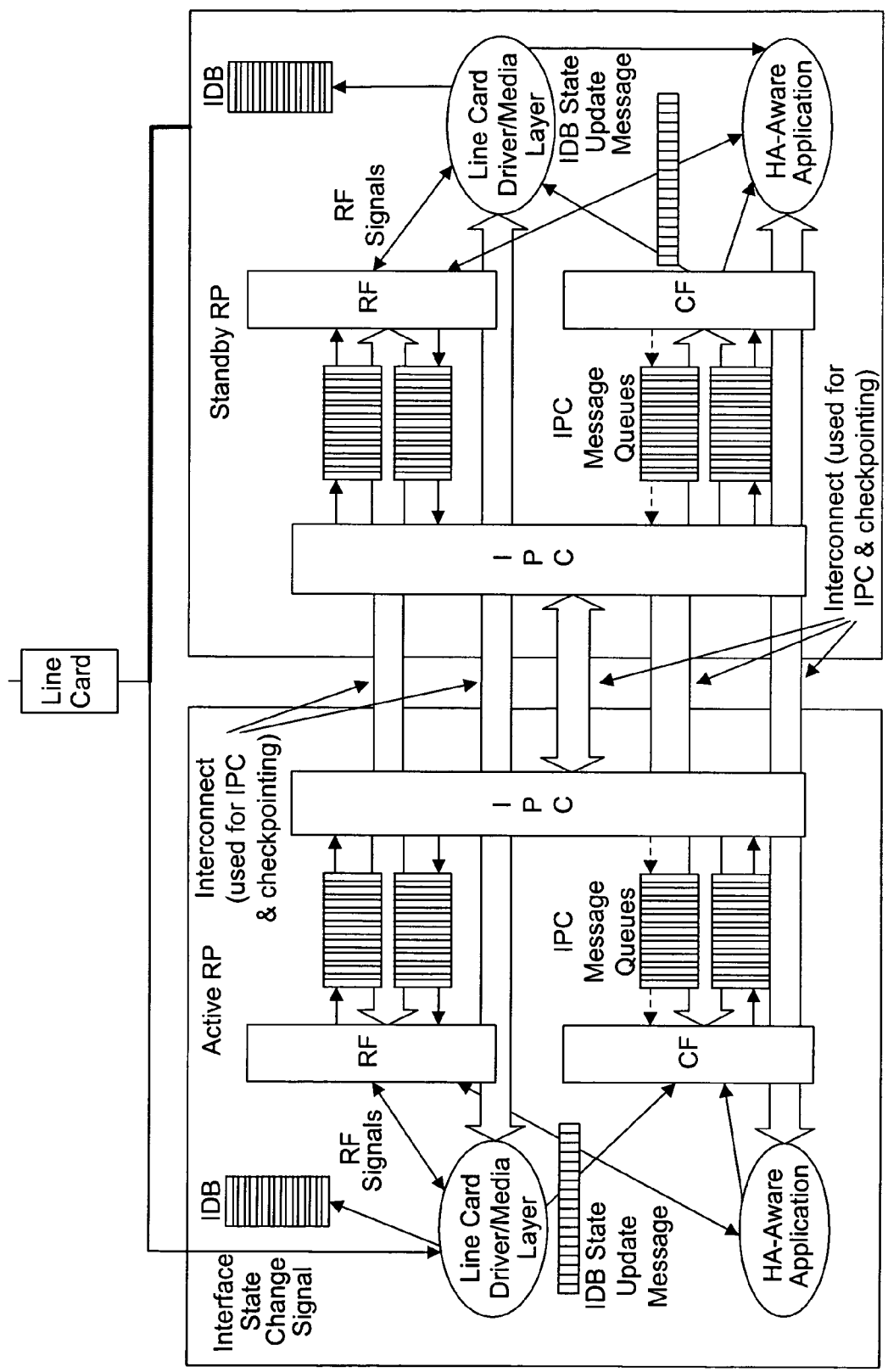
FIG. 3 is a block diagram depicting the driver-client model of an embodiment of the invention.

As depicted in FIG. 3, each RP has a Checkpointing Facility and a Redundancy Facility Implementation. Messages are passed between the Active and Standby RPs via the interconnect utilizing IPC (interprocess communication) facilities.

In a preferred embodiment a redundancy facility (RF) is utilized to determine when to initiate the configuration file sync. After initialization, the Standby RF progresses through various states until it reaches the Standby-Hot state.

The Redundancy Facility (RF) is a portable framework that provides synchronization and switchover coordination between redundant processors running IOS®. The RF infrastructure provides a series of client services as well as functions for control and monitoring of system redundancy. RF provides notification of transition events which occur on both processors to its clients.

RF clients may maintain state synchronization between their Active and Standby instances. If they choose to maintain state, clients will use the Checkpointing Facility (CF) to do so. The format of client messages and the details of the synchronization protocol are client-specific. Initial synchronization is expected to be done as a result of an RF notification. Dynamic state changes, once the systems have reached the stable state (i.e., Active-Fast and Standby-Hot for the Active and Standby RPs respectively), will be synchronized at times decided by the client application.

A client may register with RF for notification of system state progression and changes in redundancy control configuration. These notifications are provided by RF in the form of synchronous and asynchronous callbacks. Clients are expected to use events to control the state of the applications as appropriate to their role at the time of the event.

The CF facilitates the saving (i.e., synchronization) of client-specific state data which will be transferred to a peer client on a remote RP. Once a valid Active to Standby peer client checkpointing session is established, the checkpointed state data will be guaranteed to be delivered to the remote peer client at most once, in order, and without corruption. (Note that order is defined as within the state of one peer client to peer client relationship and does not imply any relationship to any other single checkpointing peer client. The order amongst non-peer clients is the order of arrival at the IPC queue).

As described above, bulk sync is the procedure where the Active RP client transfers all the relevant state data it has to the Standby RP peer client. Bulk Sync is usually associated with the initial transfer of state data which occurs when the Standby first comes up.

Thus a hybrid system is provided which allows both HA-aware and HA-unaware applications to co-exist on the same platform. This approach enables a migration to HA-aware implementations as business needs demand. It allows for continued forwarding during a switchover as all resource context remains intact and provides for quick restoration of service on the control processor as interface contexts and states do not have to be reset, re-determined or re-built.

This hybrid software solution to providing the basis for a "hitless" switchover environment allows development of implementations including those features that have a business justification while not affecting those features that do not require the enhancements at this time.

The invention may be implemented as program code, stored on a computer readable medium, that is executed by a digital computer. The computer readable medium may include, among other things, magnetic media, optical media, electromagnetic fields encoding digital information, and so on.

The invention has now been described with reference to various embodiments. Alternatives and substitutions will now be apparent to persons of ordinary skill in the art. For example, the embodiments have been describe utilizing the IOS® operating system designed by the assignee of the present application. However, the principles of the invention are applicable to various operating systems. Further, a particular synchronization system has been described utilizing redundancy and checkpointing facilities. However, as is known in the art various synchronization systems such as timers, interrupts, or polling schemes could be utilized. Accordingly it is not intended to limit the invention except as provided by the appended claims.

What is claimed is:

1. In a high-availability network device that includes redundant route processors (RPs), where an RP communicates with line cards, which provide interfaces over which traffic flows, through an interconnect, each RP having memory, where a first RP is an Active RP that controls processing and a second RP is a Standby RP which takes over processing during a switchover, where the line cards are accessible to both the Active and Standby RPs, and with an interconnect coupling the Active and Standby RPs to facilitate interprocess communication, a method for interface synchronization of the interface states on the first and second RPs so that applications that have been modified for high-availability (HA-aware applications) and non-modified applications (HA-unaware applications) can be used on the same system, the method comprising:

maintaining an Active interface description block and real and shadow Standby interface description blocks, with an interface description block storing state variables to associated with an interface on a line card, in the memories of the Active and Standby RPs;

marking the state of the real interface description block of the Standby RP as down to indicate to HA-unaware applications that the Standby RP is not communicating with line cards;

copying an Active interface description data block from Active RP memory to the shadow interface description block in Standby RP memory to initialize the Standby shadow interface description data block;

synchronizing the Standby shadow interface description data block with Active interface description data block, subsequent to initializing the standby interface description data block, whenever the Active interface description data block changes by utilizing the interconnect to send a change to the Standby RP where it is written to the shadow copy in the interface description data block on the Standby RP; and during a switchover, copying the shadow interface description block of the Standby RP to the real interface description block of the standby RP and notifying HA-unaware applications of a state change so that to HA-unaware applications it appears that the line card interface has just become available.

2. The method of claim 1 further comprising the step of:
at the Standby RP, making changes to the shadow copy of the interface description block available to HA-aware applications on the Standby RP.

3. The method of claim 1 further comprising the step of:
synchronizing forwarding information between a forwarding application on the Active and a forwarding application on the Standby RP.

4. In a high-availability network device that includes redundant route processors (RPs), where an RP communicates with line cards, which provide interfaces over which traffic flows, through an interconnect, each RP having memory, where a first RP is an Active RP that controls processing and a second RP is a Standby RP which takes over processing during a switchover, where the line cards are accessible to both the Active and Standby RPs, and with an interconnect coupling the Active and Standby RPs to facilitate interprocess communication, a system for interface synchronization of the interface states on the first and second RPs so that applications that have been modified for high-availability (HA-aware applications) and non-modified applications (HA-unaware applications) can be used on the same system, the system comprising:

means for maintaining an Active interface description block and real and shadow Standby interface description blocks, with an interface description block storing state variables to associated with an interface on a line card, in the memories of the Active and Standby RPs;

means for marking the state of the real interface description block of the Standby RP as down to indicate to HA-unaware applications that the Standby RP is not communicating with line cards;

means for copying an Active interface description data block from Active RP memory to the shadow interface description block in Standby RP to initialize the Standby shadow interface description data block;

means for synchronizing the Standby shadow interface description data block with Active interface description data block, subsequent to initializing the standby interface description data block, whenever the Active interface description data block changes by utilizing the interconnect to send a change to the Standby RP where it is written to the shadow copy in the interface description data block on the Standby RP; and means for copying, during a switchover, the shadow interface description block of the Standby RP to the real interface description block of the standby RP and notifying HA-unaware applications of a state change so that to HA-unaware applications it appears that a line card interface has just become available.

5. The system of claim 4 further comprising:
means for making changes to the shadow copy of the interface description block available to HA-aware applications on the Standby RP.

6. The system of claim 4 further comprising:
means for synchronizing forwarding information between a forwarding application on the Active RP and a forwarding application on the Standby RP.

7. A method for facilitating a fast switchover between Active and Standby processors included in a router, with the Active processor controlling line cards and interfaces and the Standby processor for taking over control of line cards and interfaces after a switchover, and with both HA-aware applications (applications which have been modified for high availability) and non-HA aware applications (applications which have not been modified for high availability) running on both the Active and Standby processors, the method comprising the steps of:
maintaining an interface descriptor block on the Active processor;
maintaining shadow and real interface descriptor blocks on the Standby processor;
marking the state of the real interface description block of the Standby RP as down to indicate to HA-unaware applications that the Standby RP is not communicating with line cards;
initializing the shadow interface descriptor block on the Standby processor by copying the interface descriptor block on the Active processor;
synchronizing changes to the interface descriptor on the Active processor to the shadow interface descriptor block on the Standby processor subsequent to initializing the standby interface description data block;
upon a switchover, copying the shadow interface descriptor block on the Standby to the real interface descriptor block on the Standby processor; and
notifying non-HA aware applications on the Standby processor that the interfaces have become available.

8. The method of claim 7 further comprising the step of:
initializing non-HA aware applications to a point where they are waiting for interfaces to become available.

9. The method of claim 7 further comprising the steps of:
making updates to the shadow interface descriptor block available to HA-aware applications on the Standby processor.

10. A system for facilitating a fast switchover between Active and Standby processors included in a router, with the Active processor controlling line cards and interfaces and the Standby processor for taking over control of line cards and interfaces after a switchover, and with both HA-aware applications (applications which have been modified for high availability) and non-HA aware applications (applications which have not been modified for high availability) running on both the Active and Standby processors, the system comprising:
means for maintaining an interface descriptor block on the Active processor;
means for maintaining shadow and real interface descriptor blocks on the Standby processor;
means for initializing the shadow interface descriptor block on the Standby processor by copying the interface descriptor block on the Active processor;
means for marking the state of the real interface description block of the Standby RP as down to indicate to HA-unaware applications that the Standby RP is not communicating with line cards;
means for synchronizing changes to the interface descriptor on the Active processor to the shadow interface descriptor block on the Standby processor subsequent to initializing the standby interface description data block:
means for copying the shadow interface descriptor block on the Standby processor to the real interface descriptor block on the Standby processor when a switchover occurs; and
notifying non-HA aware applications on the Standby processor that the interfaces have become available.

11. The system of claim 10 further comprising:
means for initializing non-HA aware applications to a point where they are waiting for interfaces to become available.

12. The system of claim 11 further comprising:
means for making updates to the shadow interface descriptor block available to HA-aware applications on the Standby processor.

13. In a high-availability network device that includes redundant route processors (RPs), where an RP communicates with line cards, which provide interfaces over which traffic flows, through an interconnect, each RP having memory, where a first RP is an Active RP that controls processing and a second RP is a Standby RP which takes over processing during a switchover, where the line cards are accessible to both the Active and Standby RPs, and with an interconnect coupling the Active and Standby RPs to facilitate interprocess communication, a computer program product for interface synchronization of the interface states on the first and second RPs so that applications that have been modified for high-availability (HA-aware applications) and non-modified applications (HA-unaware applications) can be used on the same system, the computer program product comprising:
a computer usable media having computer readable program code physically embodied therein, said computer program product further comprising:
computer readable program for maintaining an Active interface description block and real and shadow Standby interface description blocks, with an interface description block storing state variables to associated with an interface on a line card, in the memories of the Active and Standby RPs;
computer readable program code for marking the state of the real interface description block of the Standby RP as down to indicate to HA-unaware applications that the Standby RP is not communicating with line cards;
computer readable program code for copying an Active interface description data block from Active RP memory shadow interface description block to Standby RP memory to initialize the Standby shadow interface description data block;
computer readable program synchronizing the Standby interface description data block with the Active interface description data block, subsequent to initializing the standby interface description data block, whenever the Active interface description data block changes by utilizing the interconnect to send a change to the Standby RP where it is written to the shadow copy in the interface description data block on the Standby RP; and computer readable program code for copying, during a switchover, the shadow interface description block of the Standby RP to the real interface description block of the standby RP and notifying HA-unaware applications of a state change so that to HA-unaware applications it appears that the line card interface has just become available.

14. The computer program product of claim 13 further comprising:
computer readable program code for causing said Standby RP to make changes to the shadow copy of the interface description block available to HA-aware applications on the Standby RP.

15. In a high-availability router that includes redundant route processors (RPs), each RP having memory, where a first RP is an Active RP that controls processing and a second RP is a Standby RP which takes over processing during a switchover, and with an interconnect coupling the Active and Standby RPs to facilitate interprocess communication, a system for interface synchronization of the interface states on the first and second RPs so that applications that have been modified for high-availability (HA-aware applications) and non-modified applications (HA-unaware applications) can be used on the same system, the system comprising:
a bulk synchronization facility that copies an Active interface description data block from Active RP memory to Standby RP memory as a shadow Standby interface description data block to initialize the shadow Standby interface description data block and maintains the shadow Standby interface description data block state as a shadow copy in a shadow state so that non HA-aware applications on the Standby RP see Standby interfaces as not available prior to switchover; and
a dynamic synchronization facility that synchronizes the shadow Standby interface description data block with the Active interface description data block, subsequent to initializing the shadow Standby interface description data block, whenever the Active interface description data block changes by utilizing the interconnect to send the changes to the Standby RP where it is written to the shadow copy in the shadow Standby interface description data block on the Standby RP; and
a state change facility that copies the shadow Standby interface description data block state to a real interface description data block state on the Standby RP after a switchover and that notifies applications on the Standby RP of a status change so that to HA-unaware applications it appears that the line card interface has just become available.

16. The system of claim 15 where the dynamic synchronization facility makes changes to the shadow state available to HA-aware applications on the Standby RP prior to switchover.

* * * * *